C. F. PICKTON.
LOCKING MEANS FOR RETORT DOORS.
APPLICATION FILED DEC. 21, 1909.
965,221.
Patented July 26, 1910.
2 SHEETS—SHEET 1.
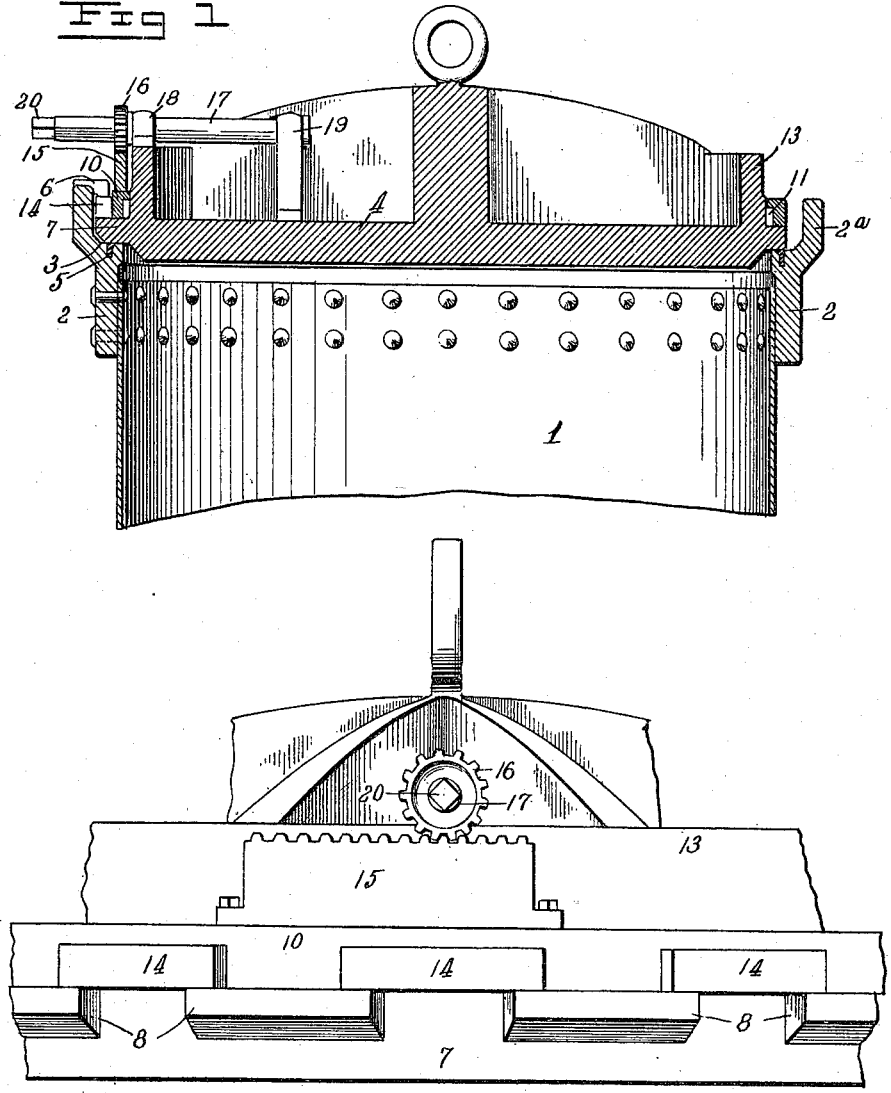

C. F. PICKTON.
LOCKING MEANS FOR RETORT DOORS.
APPLICATION FILED DEC. 21, 1909.
965,221.
Patented July 26, 1910.
2 SHEETS—SHEET 2.
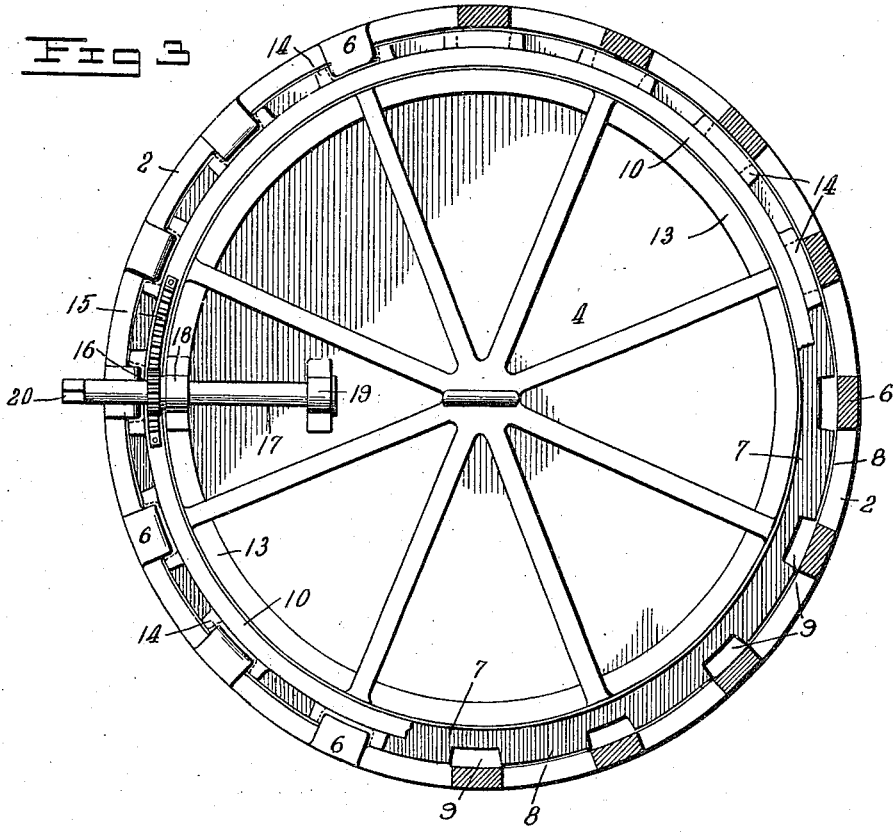
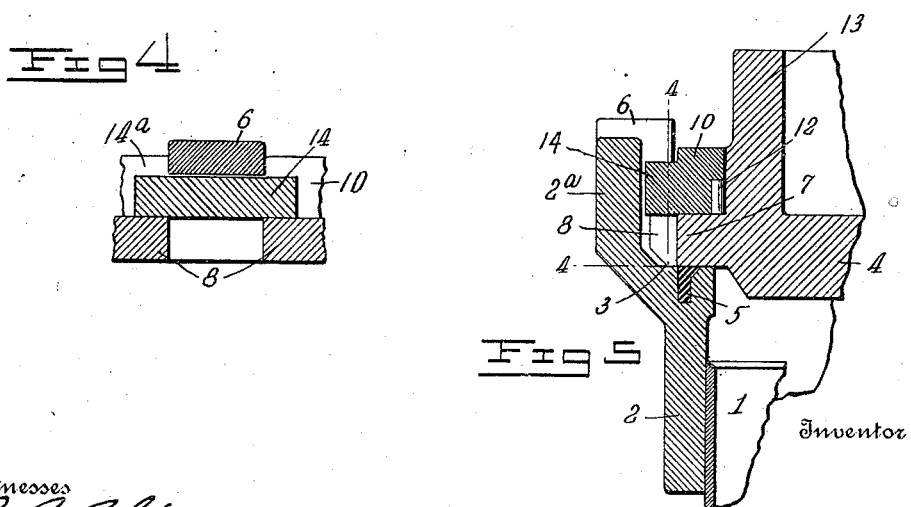

UNITED STATES PATENT OFFICE.

CHARLES F. PICKTON, OF JEANNETTE, PENNSYLVANIA.

LOCKING MEANS FOR RETORT-DOORS.

965,221.

Specification of Letters Patent. Patented July 26, 1910.

Application filed December 21, 1909. Serial No. 534,313.

*To all whom it may concern:*

Be it known that I, CHARLES F. PICKTON, a citizen of the United States, residing at Jeannette, in the county of Westmoreland and State of Pennsylvania, have invented certain new and useful Improvements in Locking Means for Retort-Doors, of which the following is a specification.

This invention relates to improvements in locking means for the doors of vessels, such as vulcanizers and like apparatus, the details and advantages of which will be pointed out in the following specification, in which, Figure 1 is a central sectional view through a door embodying my improved locking means, the vessel to which it is applied being also shown, in part, in central section; Fig. 2 is an enlarged side view of a portion of the door or cover and the locking ring; Fig. 3 is a plan view of the rim of the vessel, the cover and the locking ring, part of the ring being broken away and some of the lugs of the vessel rim being cut off, the locking ring being in locked position; Fig. 4 is a section on the line 4—4 of Fig. 5; and, Fig. 5 is a radial section taken through the vessel rim, and locking ring and part of the cover.

Referring to the drawing, 1 indicates a cylindrical vessel, to the open end of which is secured a rim 2. This rim is provided with a seat 3 for the cover 4, and a suitable packing 5 is arranged in an annular groove in said seat. The part 2ª of the rim which extends above or beyond the seat is of larger diameter than the part adjoining the vessel wall 1, and this upper part of the rim is provided with a series of lugs 6, spaced equal distances apart, and projecting inwardly over said seat. These lugs are preferably integral with the vessel rim, as shown in the drawing.

The cover 4 is provided with a rim 7 which, when the cover is in place, rests upon the seat 3 and packing 5. This cover is provided with a series of outwardly projecting teeth 8 adapted to pass between the lugs in seating or unseating the cover. The notches 9 between the cover teeth are preferably but slightly wider than the lugs 6 so that the sides of the teeth on the cover will nearly coincide with the sides of the lugs when the cover is against its seat. Upon the rim 7 of the cover is arranged a locking ring 10 which has, on its inner side, a raceway 11 (Fig. 1) in which are arranged rollers 12, (Fig. 5,) the rollers fitting between the locking ring and the rim 7 and upright wall 13 of the cover. This locking ring has a series of teeth 14 projecting outwardly and resting upon the teeth of the cover. The teeth 14 are wider than the spaces 9 between the teeth of the cover and narrower than the spaces between adjacent lugs 6 on the vessel rim so that the teeth on the ring, when brought into alinement with the teeth on the cover may pass through the spaces between the lugs, in seating, or unseating the cover, but when adjusted over the spaces 9 the teeth on the ring will bridge over or span these spaces and each rest upon two adjacent teeth 8 on the cover, as shown in Figs. 2, 3 and 4. When the cover is placed upon the seat 3 and the locking ring is turned, the teeth 14 will pass under the lugs with very slight clearance and the cover will be locked against outward movement.

The purpose of providing the teeth 8 upon the cover is to support the teeth 14 when the ring is adjusted to the locked position. If these teeth 8 were not provided the ring teeth would be subject to a bending stress, whereas, by arranging the teeth 8 upon the cover the locking teeth on the ring are supported at both sides of the lugs by the teeth 8 and the ring teeth are subject to a shearing stress instead of a bending stress.

In order to readily and quickly lock and unlock the cover, I provide a rack 15 upon the locking ring, and this is engaged by a pinion 16 which is secured to a shaft 17 journaled in suitable bearings 18 and 19 upon the cover. This shaft has an angular end 20 to which a crank may be applied, and, as will be evident, the rotation of the shaft, in one direction or the other, will cause the ring to move into the locked or unlocked position.

What I claim is:—

1. The combination with a vessel having a rim provided with a cover-seat and a series of spaced inwardly projecting lugs arranged above or beyond the seat, of a cover and a locking ring upon the cover, each having spaced, outwardly projecting, teeth adapted to register with and pass through the spaces between said lugs, in seating or unseating the cover, said ring being adjustable to carry its teeth beneath said lugs to lock the cover and the teeth on the ring being each arranged to rest upon one or more of the teeth on the cover in the locked position of the ring.

2. The combination with a vessel having a rim provided with a cover-seat and a series of spaced inwardly projecting lugs arranged above or beyond the seat, of a cover and a locking ring upon the cover, each having spaced, outwardly projecting, teeth adapted to register with and pass through the spaces between said lugs, in seating or unseating the cover, said ring being adjustable to carry its teeth beneath said lugs to lock the cover and the teeth on the ring being each wide enough to span the spaces between and rest upon two adjacent teeth on the cover when the cover is locked.

3. The combination of a vessel having a rim provided with a cover seat and with a series of spaced inwardly projecting lugs arranged above or beyond the seat, of a cover having a rim provided with a series of outwardly projecting spaced teeth, and a locking ring circularly adjustable upon said cover rim, said ring having a raceway on its inner wall for inclosing roller bearings, and having outwardly projecting spaced teeth resting upon the teeth of the cover and adapted to engage the cover teeth and said lugs when in the locked position.

4. The combination with a vessel having a rim provided with a cover-seat and a series of spaced inwardly projecting lugs arranged above or beyond the seat, of a cover and a locking ring upon the cover, each having spaced outwardly projecting teeth adapted to register with and pass through the spaces between said lugs, in seating or unseating the cover, said ring being adjustable to carry its teeth beneath said lugs to lock the cover and the teeth on the ring being each arranged to rest upon one or more of the teeth on the cover in the locked position of the ring, and means for operating said ring comprising a rack secured to the ring, a shaft suitably journaled upon the cover, and gearing operable by the shaft and engaging the rack.

In testimony whereof I affix my signature, in presence of two witnesses.

CHARLES F. PICKTON.

Witnesses:
 LA PORT HEEFNER,
 C. W. HAINES.